US007853469B2

(12) United States Patent
Maitland et al.

(10) Patent No.: US 7,853,469 B2
(45) Date of Patent: Dec. 14, 2010

(54) METHODS AND SYSTEMS FOR PREDICTING BUSINESS BEHAVIOR FROM PROFILING CONSUMER CARD TRANSACTIONS

(75) Inventors: Jill Maitland, Rye Brook, NY (US); Tatiana Murly, Fairfield, CT (US); Denise A. Walker, Newtown, CT (US); Jennifer Riddell Rademaker, Dainfern (ZA)

(73) Assignee: MasterCard International, Purchase, NY (US)

( * ) Notice: Subject to any disclaimer, the term of this patent is extended or adjusted under 35 U.S.C. 154(b) by 1075 days.

(21) Appl. No.: 10/923,947

(22) Filed: Aug. 23, 2004

(65) Prior Publication Data

US 2005/0197954 A1 Sep. 8, 2005

Related U.S. Application Data

(60) Provisional application No. 60/497,386, filed on Aug. 22, 2003.

(51) Int. Cl.
*G05B 19/418* (2006.01)

(52) U.S. Cl. .......................................................... 705/8
(58) Field of Classification Search ....................... 705/8
See application file for complete search history.

(56) References Cited

U.S. PATENT DOCUMENTS

| | | | | |
|---|---|---|---|---|
| 5,559,313 A * | 9/1996 | Claus et al. | .................... | 705/30 |
| 5,842,185 A * | 11/1998 | Chancey et al. | ................ | 705/40 |
| 5,857,079 A * | 1/1999 | Claus et al. | .................... | 705/33 |
| 6,216,129 B1 * | 4/2001 | Eldering | ................... | 705/36 R |
| 6,321,206 B1 * | 11/2001 | Honarvar | ........................ | 705/7 |
| 6,430,539 B1 * | 8/2002 | Lazarus et al. | ................ | 705/10 |
| 6,466,975 B1 | 10/2002 | Sterling | ....................... | 709/223 |
| 6,513,018 B1 | 1/2003 | Culhane | ....................... | 705/35 |
| 6,782,390 B2 * | 8/2004 | Lee et al. | .................... | 707/101 |
| 6,898,598 B2 * | 5/2005 | Himmel et al. | ................ | 707/10 |
| 6,954,758 B1 * | 10/2005 | O'Flaherty | ................... | 707/102 |
| 7,089,592 B2 * | 8/2006 | Adjaoute | ...................... | 726/25 |
| 7,165,037 B2 * | 1/2007 | Lazarus et al. | ................ | 705/10 |
| 7,251,624 B1 * | 7/2007 | Lee et al. | ....................... | 705/35 |
| 7,263,506 B2 * | 8/2007 | Lee et al. | ....................... | 705/38 |
| 7,437,330 B1 * | 10/2008 | Robinson et al. | .............. | 705/67 |
| 7,624,073 B1 * | 11/2009 | Robinson et al. | .............. | 705/67 |
| 2002/0099649 A1 * | 7/2002 | Lee et al. | ....................... | 705/38 |
| 2003/0061132 A1 * | 3/2003 | Yu et al. | ........................ | 705/30 |
| 2003/0176931 A1 * | 9/2003 | Pednault et al. | ............... | 700/31 |

OTHER PUBLICATIONS

Leora Michael C., Segmenting Credit Card Holders by Behavior Journal of Retail Marketing, vol. 13, No. 1, Spring 1991.*

(Continued)

*Primary Examiner*—Scott L Jarrett
(74) *Attorney, Agent, or Firm*—Baker Botts LLP

(57) ABSTRACT

A system and method are provided for predicting small business behavior by analysis of consumer payment card transaction data. Transaction and amount velocity analysis of industry categories and/or real-time transaction-based profiling is employed to identify those consumer payment card accounts that are being inappropriately used to make small business purchases. A small business behavior predictor model is used to score transaction data and update cardholder profiles according to the likelihood that the transaction data represents small business activity.

11 Claims, 2 Drawing Sheets

OTHER PUBLICATIONS

Growing the business card Funds Transfer Report, Dec. 1994.*
Berry, Alexander, Using market segmentation for corporate customers Commercial Lending Review, vol. 10, No. 3, Summer 1995.*
Gary Angel et al., Using Card Transaction Data American Demographics, vol. 20 No. 8, Aug. 1998.*
HNC Systems Sheds New Light on Cardholder Profile Card news, Dec. 7, 1998.*
Cabena, Peter et al., Intellignet Miner for Data—Applications Guide IBM, Mar. 1999, SG24-5252-00.*
First Data Teams with ieWild on New Internet Technology Card News, vol. 16, No. 4, Mar. 7, 2001.*
Credit cards: making money from the merchant card busienss CTS Accounting Software Survey, vol. 24, No. 1, Nov. 1990.*
Berry, Alexander III, Using Market Segmentation for Corporate Customers Commercial Lending Review, vol. 10, No. 3, Summer 1995.*
Black, Joanne, Market segmentation is key to card profits American Banker, Nov. 8, 1993.*
Francese, Paul A. et al., Finding the Customer American Demographci, vol. 13, No. 1, Jan. 1991.*
Cardwatch: Cracking the small-business market Credit Card Management, vol. 3, No. 3, Jun. 1990.*
Reategui,Eliseo B. et al., A Classification System for Credit Card Transactions Advances in Case-Based Reasoning, Proceedings of the Second European Workshop EWCBR-94 (LNCS 984) Haton, 1994.*
U.S. Appl. No. 10/800,875, filed Mar. 15, 2004.
"Digital Connexxions Awarded U.S. Patent for its Innovative Predictive Marketing Technology," Press Release, Feb. 18, 2003, http://www.dconx.com/news.html.

* cited by examiner

METHODS AND SYSTEMS FOR PREDICTING BUSINESS BEHAVIOR FROM PROFILING CONSUMER CARD TRANSACTIONS

CROSS-REFERENCE TO RELATED APPLICATION

This application claims the benefit of U.S. provisional patent application No. 60/497,386, filed on Aug. 22, 2003.

BACKGROUND OF THE INVENTION

Banks and other financial institutions offer different types of credit card and debit payment card accounts that are designed to meet the needs of both personal consumers and small businesses. While these card accounts have many similarities, they are also differences targeted to the different type of cardholders. For example, in comparison to a personal credit card account, a small business credit card account may feature increased card spending controls, more flexible billing arrangements, improved tracking and reporting functions, easier ability to integrate transaction data into accounting systems, and additional business and travel insurance.

Notwithstanding the advantages of using a dedicated small business account, consumer accounts are frequently used by small businesses to purchase goods and services. In such cases, the small businesses will not receive the benefits of a dedicated small business account, and the bank or financial institution will miss the opportunity to provide such additional benefits and to receive the additional revenue from providing such benefits. It is therefore advantageous for banks and financial institutions to identify consumer accounts that are used to make purchases for small business use and to target these accounts with offers of a small business account.

Traditionally, banks and financial institutions make their targeting or other marketing decisions based upon customer profiles either purchased from a third party provider or generated by analyzing corporate data, which is collected in a data warehouse. In the latter case, the customer profiles are usually developed in response to ad hoc inquires by applying data mining techniques to historical or accumulated transaction data. The accumulated transaction data may include data on merchant-customer transactions over a period of months or years. However, making ad hoc inquiries of accumulated transaction data requires significant time and resources, generates intermittent heavy workloads for key personnel, and places intermittent heavy demands on enterprise resources. Further, customer profiles obtained by conventional data mining may be outdated as they are based on information that has accumulated over a period of many months or years. Accordingly, profiles obtained by conventional data mining are not well suited for rapidly detecting patterns in the purchasing behavior of consumer or small business cardholders.

Recently, MasterCard International Incorporated ("MasterCard") has developed systems and methods for real-time transaction-based cardholder profiling. See, for example, MasterCard's co-pending U.S. patent application Ser. No. 10/800,875 by Chris Merz, filed Mar. 15, 2004 ("Merz"), which is hereby incorporated by reference in its entirety herein. The real-time transaction-based profiling systems and methods are designed to make a rolling profile summary of each cardholder's behavior available for immediate analysis. A rolling profile summary may contain timely information such as "three purchases were made within one month from vendors within the 'jewelry and giftware' category", "the average purchase amount for this cardholder is $52", "this cardholder is interested in sports," etc. The rolling profiles can also contain up-to-date estimates of home ZIP code, age, gender, income, and other demographic or behavioral information.

Consideration is now being given to ways of improving the targeting of small business account card offers to consumer accounts that are being inappropriately used to make purchases for small business use. Attention is directed to ways of predicting small business behavior from consumer card transactions. In particular, attention is directed to real-time transaction-based profiling procedures for more accurately identifying those consumer credit/debit card accounts that are being inappropriately used to make small business purchases.

SUMMARY OF THE INVENTION

In accordance with the present invention, methods and systems are provided for predicting small business behavior from consumer card transactions.

Using the inventive systems and methods, consumer payment card transaction data is analyzed to determine which cardholders exhibit behavior that is more characteristic of a small business than a consumer. Holders of consumer payment cards exhibiting small business type behavior can then be targeted for marketing of dedicated small business payment cards.

Preferably, the method of the present invention comprises preparing a transaction data file including information on transactions performed by a customer with merchants in a given time period, the transaction data file preferably including transaction reports containing information on the transactions performed by the customers and on the merchants involved in the transactions.

The method further comprises retrieving a profile on the customer ("consumer profile") including one or more attributes that are of interest, such as may be related to geographic, demographic or behavioral characteristics of the transaction cardholder.

The method of the present invention further comprises updating the customer profile by providing a small business data field and by assigning a value to the small business data field by applying a profiling model, which bases the value on transaction information and the retrieved profile.

The methods for predicting business behavior of a consumer from a sample of said consumer's payment card transactions may involve performing velocity analysis of the sample for a select set of industry categories, and according to the transaction and/or amount velocities in these select industry categories determining the business behavior of the consumer. High velocities in any of some select industry categories (e.g., CEA, CSV, TEA−T+E, TER−T+E and TEH−T+E) may correspond to a positive indicator of small business behavior. Conversely, high velocities in any of other select industry categories (e.g., AAX and INV) may correspond to a negative indicator of small business behavior.

Further features of the invention, its nature and various advantages will be more apparent from the accompanying drawings and the following detailed description.

DETAILED DESCRIPTION OF THE INVENTION

The present invention is described in the context of credit card transactions with the understanding that the inventive principles of the present invention are applicable to other types of transactions and customer information data, which may be recorded or reported in a timely or regular manner.

A method and a system are provided for predicting small business behavior by analysis of consumer credit card transaction data. Specific data and data patterns in the transaction data may be considered to be indicative of small business behavior. For example, "merchant type" data such as office supplies, repro services, and computer purchases may be considered to be indicative of small business behavior. A pattern of regular purchases of large ticket items at Home Depot may indicate that the cardholder is a building contractor. Similarly, a pattern of repeat airline ticket purchases or frequent gasoline purchases may indicate that the cardholder is a traveling small business owner. One or more suitable small business behavior models (i.e. "predictor models") are used to characterize the transaction data fields, and to accordingly assign or add model scores to the cardholder's profile. Small business behavior may be predicted by evaluating the predictor model scores that are assigned to the cardholder's profile. The predictor models may be tailored to identify small business owners who are using personal consumer cards for their small business purposes.

The method and system may involve real-time transaction based profiling of consumer cardholders to obtain a rolling profile of each credit cardholder's behavior. Real time transaction-based profiling permits the model scores assigned to the customer profiles to be updated frequently. These updated model scores can be readily made available to card issuing banks and financial institutions so that they may make timely marketing decisions based on current data.

The real-time transaction based profiling may be implemented using any suitable data processing arrangements. A suitable data processing arrangement may, for example, include communication networks, computer hardware, databases and other software that are similar to those described in Merz.

Figure 1:
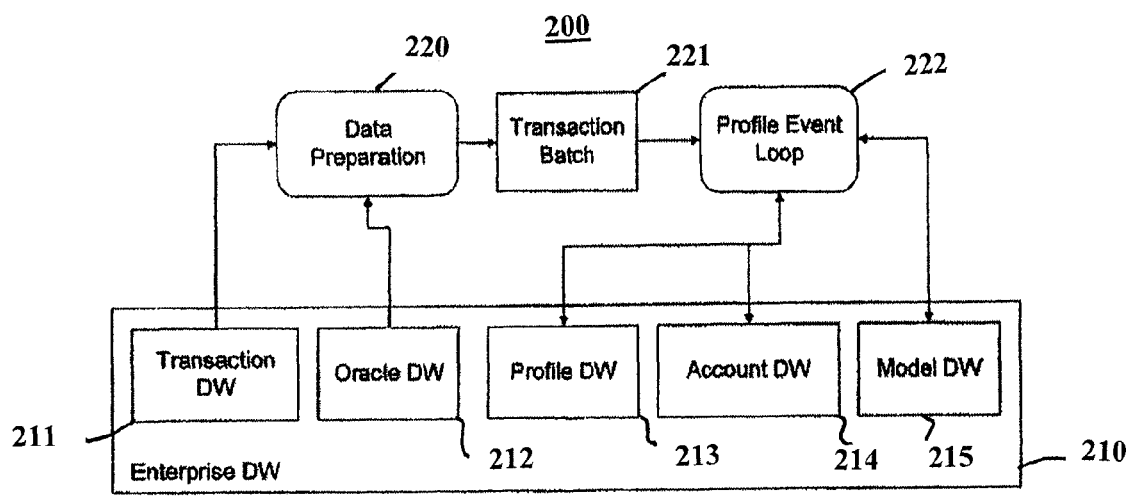
FIG. 1 is a block diagram illustrating the components of an exemplary system, which can be used for transaction-based customer profiling, in accordance with the present invention.

FIG. 1 shows an exemplary system 100 which may be used to carry out real-time transaction-based profiling processes (e.g., FIG. 2 process 300) to identify consumer credit cardholders who use their credit cards for small business activities. System 100 may include an enterprise data warehouse 200, which contains data warehouses 211-215 that are utilized and/or created during the profiling processes.

Transaction data warehouse 211 may be a data warehouse for storing processed customer-merchant transaction data reports. Each transaction data report may include account numbers identifying the merchant and customer, and other transaction information such as the transaction amount and date. Oracle data warehouse 212 may contain supplemental merchant information associated with each merchant name or account number contained in the processed customer merchant transaction reports in transaction data warehouse 211. The supplemental information may include information such as the merchant ZIP code, Merchant Category Code, and Industry code. These terms would be known to those in the trade as representing a code assigned to a particular category of merchants in a certain industry (i.e. travel, restaurants, etc.). Similarly, account data warehouse 214 contains information specific to the credit card account holder including information such as demographic information, address and ZIP code.

Profile data warehouse 213 contains customer profiles. A customer profile may include data fields for conventional profiling attributes and characteristics (e.g., demographic and gender attributes like those described in Merz). The customer profile additionally includes at least a figure of merit or attribute (e.g., a predictor model score), which indicates whether the customer is a small business.

Model data warehouse 215 may be a store in which various models and logic for evaluating transaction data and updating cardholder profiles are stored. The models and logic stored include a small business predictor model for evaluating transaction data and generating the model scores-that are a measure of small business behavior. System 200 also includes a data preparation module 220, a transaction batch module 221, and a profile-modeling module 222. System 100 may be implemented using conventional computer hardware and application software configurations including, for example, distributed server systems. System 100 also may include other conventional hardware and software components that are not shown in FIG. 1 (e.g., user terminals and data warehouse query tools).

A suitable small business predictor model may be empirically developed. The predictor model may be designed to generate the model scores by analyzing particular transaction types or transaction patterns in the transactions data. The predictor model may for, example, assign small business behavior scores depending on whether a customer makes purchases from office supplies merchants, uses reproduction services, or buys computer equipment. Other possible models may assign small business behavior scores depending on whether the customer frequently purchases large ticket amounts at a home supply store (indicating a building contractor), or frequently purchases of airline tickets and/or gasoline (indicating a traveling small business owner). The ability of a predictor model to correctly identify small business behavior can be assessed by conducting empirical market "lift" studies or research. The market research may involve measurement of the response of test and control groups to a marketing offer. The control group may be a uniform random sample of a bank or financial institution's portfolio, i.e., a batch of cardholders who receive a marketing offer independent of their model score. The test group may be the top nth percentile of small business behavior identified by the predictor model scores.

The predictor model may be designed to generate model scores so that higher the scores, the greater the likelihood of offer uptake. The prediction/probability of offer uptake may be estimated from the model scores by statistical analysis (e.g. by using logistic regression algorithms). The predictor model may be configured to generate simple binary scores (i.e. "Yes" or "No") to indicate a low or high likelihood of small business behavior, and to accordingly indicate, for example, whether the cardholder should be targeted with an offer of a small business account. Alternatively, the predictor model may be configured to generate graded model scores that directly correlate with the likelihood of small business behavior, for example, within various industry vertical sectors of small businesses.

Figure 2:
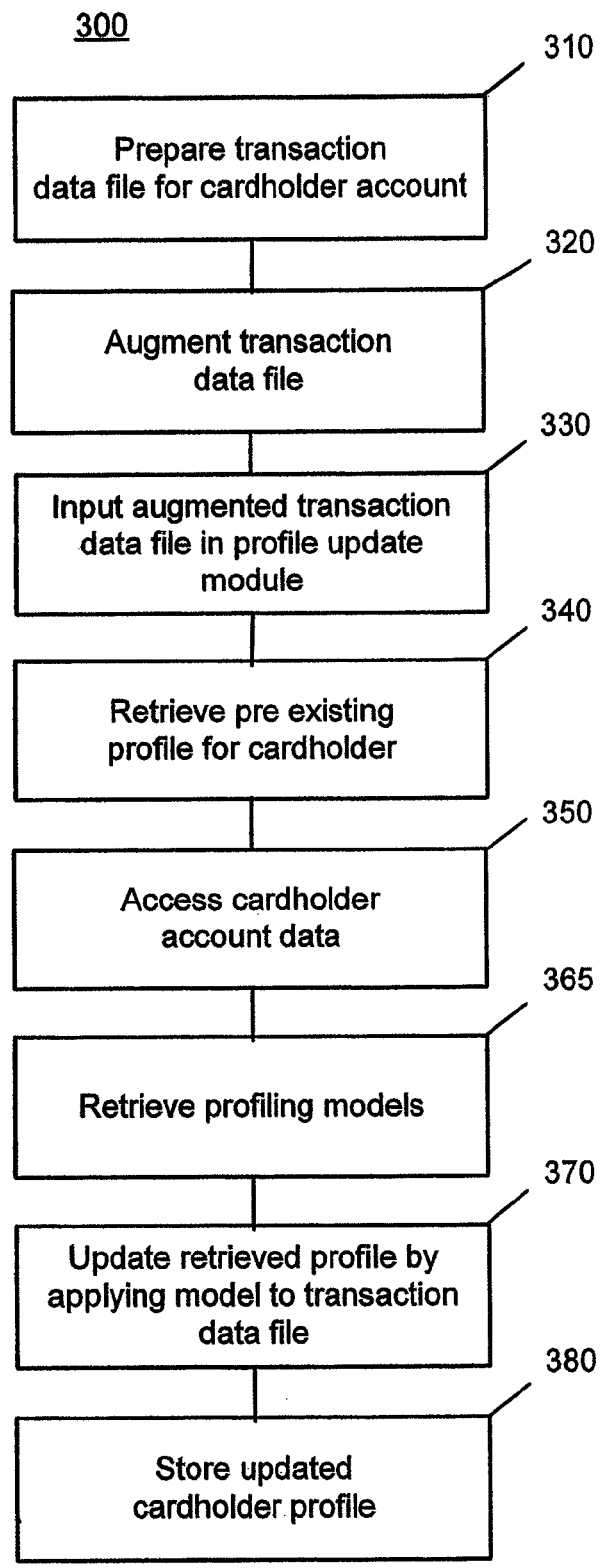
FIG. 2 is a flow chart illustrating the steps of an exemplary process for updating a customer profile with a score of the likelihood that the customer is a small business, in accordance with the present invention.

FIG. 2 shows some of the steps of an exemplary profiling process 300, which may be used in conjunction with system 100 to generate and update the profile of a credit cardholder having an account with a credit card issuer. With reference to FIGS. 1 and 2, at steps 310 and 320 of profiling process 300, a transaction data file (e.g. transaction batch 221) is prepared for use in updating the cardholder profile. At step 310, the transaction data file may be prepared, for example, in data preparation module 220, by querying and retrieving transaction reports associated with the cardholder's account number from transaction data warehouse 211. The retrieved transaction reports may span a suitable time period (e.g., a day, week, month or year). The suitable time period may correspond, for example, to the frequency at which the cardholder profile updates are desired or to a natural frequency (e.g., daily) at which transaction reports are received or assembled in transaction data stores data warehouse 211. Further at step 320, the retrieved transaction reports may be augmented with information from the Oracle data warehouse 212. In particular, each transaction report may be augmented with the merchant ZIP code, Merchant Category Code, and Industry code to create a transaction batch 221 that contains merchant information.

The transaction data file (e.g., transaction batch 221) prepared at steps 310 and 320 is used to update the profile of the cardholder. At step 330, the transaction data file is input into a profile-updating module, shown as profile event loop 222 in FIG. 1., for this purpose. At step 340, the previous profile of cardholder is retrieved (e.g., from profile data warehouse 213) and made available to the profile-updating module. Also at optional step 350, a cardholder account data file retrieved from account data warehouse 214 may be made available to the profile-updating module.

At step 370, profile-updating module 222 processes the transaction data batch file and the optional cardholder account data file to update the previous profile of cardholder using a suitable a small business behavior predictor model. The suitable model may be stored in profile-updating module 222 or acquired from model store 215 at an optional preceding step 360. The profile-updating module may utilize the suitable small business behavior predictor model to update or score appropriate data fields in the previous profile of cardholder in response to specific information in the transaction data batch file (e.g., frequent airline ticket purchases). At step 380, the updated profile may be stored in profile warehouse 213 and/or otherwise made available for inspection or review for prompt business action.

It will be understood that the particular sequence of steps 310-380 in process 300 has been described herein only for purposes of illustration. The steps of process 300 may be performed in any other suitable sequence or concurrently. Further, some of the described steps may be omitted and/or new steps may be added to process 300 as appropriate, for example, in consideration of the types of data processed or the types profile updates desired.

The development of a profile data warehouse 213, which contains cardholder profile attributes or scores including the likelihood of small business behavior, allows the significant front time associated with traditional ad hoc data mining to be avoided. Further, as different cardholder profiles are used and modified, including the score indicating likelihood of small business behavior, profile data warehouse 213 is likely to becomes an ever more useful enterprise resource, since a required profile may already have been created and be readily accessible.

A profiling case study demonstrates the industrial utility of transaction-based profiling systems and processes in predicting which members of a customer base have the attributes of a small business. The case study utilized historical account data records from a sample of transaction data spanning a time period of about 15 months from August 2001 to November 2002. The sample was a subset of a 5% pool sample maintained by the MasterCard Statistical Sciences Team. The 5% pool sample is a randomly generated population representing all card products in the U.S. in the same proportion as the larger data warehouse population and includes active and inactive cards. The obtained data records included all transactions reported over a one-year period in the credit card accounts following a four to six-month maturation phase. The important data fields retained were: account number, product code, processing date, transaction amount, and industry code. These transaction data records were used to generate cardholder profiles.

The case study used a secured MCIDEAS SUN-Sparc server with 100 GB of allocated disk space. SAS version 8.2 was used for data extraction and modeling, and Microsoft Excel was used for delivery of deciles and lift charts.

In the case study, there were two possible target variables: (1) business cards from known small business bank identification numbers ("BINs"), which were chosen in order to capture relevant small business behavior, and (2) all business cards reflecting big business behavior as well as small business behavior. For the small business card model, the "Business cardholders" variable—the target variable for the final model—was set to "Yes" (1), if the card number was within one of specified BIN ranges, otherwise the "Business cardholder" variable was set to "No" (0). For the all business cards model, the "Business cardholder" variable was set to "Yes" (1), if the card holder product was in one of the following product codes: MCD ("Business credit"), MCP ("Purchasing Card"), MCF ("Fleet Card"), MCO ("Certified Corporate Card"), MEO ("Executive Corporate Card"), MEB ("Executive Business Card"), MWB ("World Business Card") and MWO ("World Corporate Card").

Key indicators of small business spending were chosen to be purchases made in the following categories: Office Supplies; Home Improvement, Travel (including, Hotel, Airfare, Car Rental); Non-Store Spending, Computers/Software, Couriers and Auto Retail. On the other hand, key indicators of consumer spending were chosen to be purchases made in the following categories: Department Stores, Books, Movies, Videos, Optometry, Groceries, Apparel, Jewelry and Sporting Goods.

In the case study, the data construction process was a significant step in the larger process of data preparation. In the data construction process, the set of transactions for each account were converted into a series of profile versions. The transactions were batched by transaction month and each month's transactions passed into the profile engine. The profiles were updated with each transaction and the final version of each account's profile was output at the end of the month.

The 5% pool sample of transactions was further broken down into 1% hashes. The first hash was used to form a training partition, while the fifth hash was used for validation. This was done because the entire 5% pool offered too much data for the case study. The validation set was formed by retaining only the last version of each account's profile, so that each account was scored only once.

In the case study, the models explored two sets of independent variables: (1) transaction velocity variables (m2)—these variables were used because the data exploration phase revealed that the variance in transaction velocity variables was much lower than the dollar velocity variables; (2) transaction velocity and amount velocity variables (m3)—these variables were used in order to test the hypothesis that both transaction volume and dollar volume are useful in discriminating between business and personal card spending.

Each set of independent variables was trainable on the following tags: (1) the business owner tag ("BO"), as defined by the specific business card product codes listed above, and (2) the small business owner tag ("SBO"), as defined by specified known small business card BIN ranges. The list of models built is set forth in Table 1.

TABLE 1

List of Models Built

|  |  | Dependent Variables | |
| --- | --- | --- | --- |
| Table of Model Names | | BO | SBO |
| Independent Variables | Transaction Velocity (m3) | m2_tBO | m2_tSBO |
| | Transaction and Dollar Velocity (m2) | m3-tBO | m3-tSBO |

Models were validated by training with one hash portion and testing with the other, and vice versa, so that gain charts and model weights could be compared for stability. Using the default parameters for SAS Proc Logistics software, which is a maximum likelihood technique that models the probability of the dependent variable either being 1 or 0, all four models were built successfully. The model fit statistics—e.g., AIC SC and −2log2, suggest that that the variables used in the regression do a good job of explaining the variance in the small business owner (SBO) tag. This was reconfirmed by a Hosmer and Lameshow Goodness-of Fit test, which is well-known to those skilled in the art.

Each of the models above was evaluated in the validation data set using the BIN-based (SBO) tag. Ultimately, two main models were built. For the BIN-based (SBO) tag, an initial model was built using all of the available variables, followed by a series of logistic models and an iterative approach being used to determine the final model. For the product-id based tag (BO), no follow up work was done after it was realized that the BIN-based (SBO) tag was adequate.

A review of the estimates produced in the case study suggests that heavier transaction and amount velocity in Consumer Electronics/Applicances (CEA), Courier Services (CSV), Airlines (TEA−T+E), Restaurants (TER−T+E) and Hotels (TEH−T+E) industry categories is indicative of small business spending patterns. On the other hand, heavier transaction and amount velocity in Miscellaneous Apparel (AAX) and Not Valid-No Data (INV) industry categories is indicative of personal spending purposes.

In an exemplary application of the present invention, a credit card issuer may regularly monitor and analyze credit card transactions as a credit cardholder completes a transaction a series of transactions, or on a periodic basis. The credit cardholders' profiles may be stored in accessible profile data warehouses so that the profiles can be readily retrieved and updated frequently. The profiles may be stored as either fixed or variable length formatted data records. The data records may include data fields that correspond to one or more profile variables or attributes that are of interest, such as whether the cardholder is likely to be a consumer or small business. The data records also may include data fields that which correspond to statistical measures of belief or confidence associated with the assigned values of the other profile variables or attributes.

Although the present invention has been described in connection with specific exemplary embodiments, it should be understood that various changes, substitutions, and alterations apparent to those skilled in the art can be made to the disclosed embodiments without departing from the spirit and scope of the invention.

We claim:

1. A method for identifying a consumer conducting business transactions using a non-business payment card account by analysis of payment card transaction data, the method comprising:
receiving a transaction data file from a transaction data warehouse, said data file including consumer payment card transaction data records reflecting payment transactions using said non-business payment card account;
retrieving a business behavior predictor model from a model data warehouse, said business behavior predictor model containing logic for identifying business spending using a non-business payment card account, said logic based on at least one transaction characteristic for purchases associated with one or more merchant category indicators;
and processing said transaction data file with a computer programmed in accordance with said logic to generate at least one consumer profile score associated with said consumer; wherein said consumer profile score is indicative of a likelihood that said consumer is conducting business transactions with said non-business payment card account.

2. The method of claim 1, further comprising storing an account profile associated with said consumer in a profile data warehouse, said account profile including said at least one consumer profile score.

3. The method of claim 2, further comprising:
retrieving, prior to said processing said transaction data file, said account profile from said profile data warehouse,
periodically updating said consumer profile score based on said logic contained in said business predictor model, and
storing said updated profile score in said profile data warehouse after said processing.

4. The method of claim 3, wherein said periodically updating occurs at least once per month.

5. The method of claim 1, wherein said predetermined merchant category indicator is at least one of a Merchant Category Code and a Standard Industrial Classification code.

6. The method of claim 1, wherein said predetermined merchant category indicator is associated with merchants selected from the group consisting of Consumer Electronics, Courier Services, Airlines, Restaurants, Hotels, Office Supplies, Reproduction Services, and Fuel merchants
wherein said logic is arranged such that an increased transaction characteristic associated with purchases at said merchant category indicator results in said consumer profile score corresponding to a higher likelihood that said consumer is conducting business transactions with said non-business payment card.

7. The method of claim 1, wherein said predetermined merchant category indicator is associated with merchants selected from the group consisting of Miscellaneous Apparel and Not Valid-No Data, wherein said logic is arranged such that an increased transaction characteristic associated with purchases at said merchant category indicator results in said consumer profile score corresponding to a lower likelihood that said consumer is conducting business transactions with said non-business payment card.

8. The method of claim 1, further comprising generating a report identifying at least one consumer having a consumer profile score.

9. The method of claim 1, further comprising transmitting a small business account card offer to said consumer.

10. The method of claim 1, wherein said merchant category indicators are associated with purchases from at least one category of merchants.

11. The method of claim 1, wherein said at least one transaction characteristic is selected from the group consisting of transaction velocity, transaction volume, spending velocity, and spending volume.

* * * * *